United States Patent
Oh et al.

(10) Patent No.: US 11,410,528 B2
(45) Date of Patent: Aug. 9, 2022

(54) METHOD AND SYSTEM FOR PROVIDING EMERGENCY RESCUE REQUEST AND LOSS PREVENTION

(71) Applicant: EHI, Suwon-si (KR)

(72) Inventors: Seung Jin Oh, Suwon-si (KR); Sang Uk Kim, Suwon-si (KR)

(73) Assignee: EHI, Suwon-si (KR)

( * ) Notice: Subject to any disclaimer, the term of this patent is extended or adjusted under 35 U.S.C. 154(b) by 0 days.

(21) Appl. No.: 16/954,398

(22) PCT Filed: Apr. 11, 2019

(86) PCT No.: PCT/KR2019/004327
§ 371 (c)(1),
(2) Date: Jun. 16, 2020

(87) PCT Pub. No.: WO2020/004783
PCT Pub. Date: Jan. 2, 2020

(65) Prior Publication Data
US 2021/0104147 A1    Apr. 8, 2021

(30) Foreign Application Priority Data

Jun. 28, 2018  (KR) .................. 10-2018-0074445

(51) Int. Cl.
*G08B 25/10*  (2006.01)
*G08B 21/24*  (2006.01)
(Continued)

(52) U.S. Cl.
CPC .............. *G08B 21/24* (2013.01); *G01S 11/06* (2013.01); *G08B 21/0277* (2013.01); *G08B 21/182* (2013.01); *H04W 4/80* (2018.02)

(58) Field of Classification Search
CPC .. G08B 21/24; G08B 21/0277; G08B 21/182; H04W 4/80; G01S 11/06
(Continued)

(56) References Cited

U.S. PATENT DOCUMENTS

2003/0063003 A1* 4/2003 Bero ................. G08B 21/0225
340/573.1
2013/0217332 A1* 8/2013 Altman ................. H04H 60/90
455/3.01
(Continued)

FOREIGN PATENT DOCUMENTS

KR        10-1412811 B1    6/2014
KR    10-2015-0090552 A    8/2015
(Continued)

OTHER PUBLICATIONS

International Search Report of corresponding PCT Application No. PCT/KR2019/004327—4 pages (dated Jul. 30, 2019).
(Continued)

*Primary Examiner* — John F Mortell
(74) *Attorney, Agent, or Firm* — Knobbe, Martens, Olson & Bear, LLP (57) ABSTRACT

The present invention relates to a method and system for an emergency rescue request and loss prevention. The method includes checking an operation mode activation signal by the electronic device connected to a portable device through Bluetooth low energy (BLE) communication, activating a loss prevention mode and outputting an alarm when the operation mode activation signal that a strength of a BLE signal transmitted from the portable device is a threshold value or less and transmitting to a pre-stored contact number a message which is generated on the basis of surroundings data acquired from at least one of a camera and a microphone provided in the electronic device, activating an emergency rescue request mode when the operation mode activation signal is generated from an outside of the portable device. The method and system can also be applied to other embodiments.

7 Claims, 6 Drawing Sheets

(51) Int. Cl.
 *H04W 4/80* (2018.01)
 *G01S 11/06* (2006.01)
 *G08B 21/02* (2006.01)
 *G08B 21/18* (2006.01)

(58) Field of Classification Search
 USPC .......................................... 340/539.32, 539.1
 See application file for complete search history.

(56) References Cited

U.S. PATENT DOCUMENTS

| | | | |
|---|---|---|---|
| 2015/0048943 A1 | 2/2015 | Chen et al. | |
| 2015/0065082 A1* | 3/2015 | Sehgal | G08B 25/016 455/404.2 |
| 2015/0242665 A1* | 8/2015 | Antonescu | G06K 19/0724 340/8.1 |
| 2015/0279199 A1* | 10/2015 | Yarkoni | G08B 25/016 340/539.11 |
| 2015/0356858 A1* | 12/2015 | Daoura | A44B 15/00 340/539.32 |
| 2016/0183046 A1 | 6/2016 | Kwon | |

FOREIGN PATENT DOCUMENTS

| | | |
|---|---|---|
| KR | 10-2016-0037590 A | 4/2016 |
| KR | 10-2016-0136140 A | 11/2016 |
| KR | 10-1818119 B1 | 2/2018 |

OTHER PUBLICATIONS

Extended European Search Report in EP Patent Application No. 19825787.5, dated Mar. 21, 2022.

* cited by examiner

METHOD AND SYSTEM FOR PROVIDING EMERGENCY RESCUE REQUEST AND LOSS PREVENTION

TECHNICAL FIELD

The present invention relates to a method and system for an emergency rescue request and loss prevention.

BACKGROUND ART

With the development of wireless communication, electronic devices, such as smart phones and tablet personal computers (PCs), are being more actively supplied, and the electronic devices have currently become necessities. Accordingly, electronic device manufacturing companies are producing electronic devices which have better performance and perform various functions.

In particular, for users exposed to violent crimes which are increasing day by day, an emergency rescue request function for making a rescue request using an electronic device is being added. However, even in an emergency situation in which it is difficult to operate an electronic device, a user should operate his or her electronic device directly to make an emergency rescue request.

Also, with an increase in the number of tourists traveling overseas, a loss prevention function and the like for preventing loss of belongings, such as a bag, is being added recently. However, the loss prevention function only provides an alarm to a user when an electronic device is spaced a predetermined distance or more away from a belonging to which a tag for loss prevention is attached. Consequently, it is not easy to find the belonging after the belonging is lost.

DISCLOSURE

Technical Problem

With the development of wireless communication, electronic devices, such as smart phones and tablet personal computers (PCs), are being more actively supplied, and the electronic devices have currently become necessities. Accordingly, electronic device manufacturing companies are producing electronic devices which have better performance and perform various functions.

In particular, for users exposed to violent crimes which are increasing day by day, an emergency rescue request function for making a rescue request using an electronic device is being added. However, even in an emergency situation in which it is difficult to operate an electronic device, a user should operate his or her electronic device directly to request an emergency rescue.

Also, with an increase in the number of tourists traveling overseas, a loss prevention function and the like for preventing loss of belongings, such as a bag, is being added recently. However, the loss prevention function only provides an alarm to a user when an electronic device is spaced a predetermined distance or more away from a belonging to which a tag for loss prevention is attached. Consequently, it is not easy to find the belonging after the belonging is lost.

Technical Solution

One aspect of the present invention provides a method of an emergency rescue request and loss prevention of an electronic device including: checking an operation mode activation signal by the electronic device connected to a portable device through Bluetooth low energy (BLE) communication, activating a loss prevention mode and outputting an alarm when the operation mode activation signal that a strength of a BLE signal transmitted from the portable device is a threshold value or less and transmitting to a pre-stored contact number a message which is generated on the basis of surroundings data acquired from at least one of a camera and a microphone provided in the electronic device, activating an emergency rescue request mode when the operation mode activation signal is generated from an outside of the portable device.

The outputting of the alarm may further include transmitting an alarm output message to the portable device so that the portable device outputs the alarm.

The method may further include, activating the loss prevention mode and outputting the alarm when the operation mode activation signal is a signal generated from the outside of the portable device to search for the electronic device.

The method may further include, before the checking of the operation mode activation signal, storing the contact number as settings information when the electronic device is connected to the portable device.

The method may further include, after the activating of the loss prevention mode and the outputting of the alarm, checking a location of the electronic device from a point in time at which the strength of the BLE signal is the threshold value or less, receiving a final location check signal, checking a location of the electronic device at a point in time at which the BLE signal is finally received from the portable device and displaying map data which added the checked location.

The transmitting of the message to the pre-stored contact number may include checking a location of the electronic device from a point in time at which the emergency rescue request mode is activated and transmitting to the pre-stored contact number the message which the checked location included.

Another aspect of the present invention provides a system for an emergency rescue request and loss prevention, the system including a portable device configured to perform BLE communication and including a first body and a second body separable from the first body and an electronic device configured to activate a loss prevention mode and output an alarm when an operation mode activation signal checked through communication with the portable device implies that a strength of a BLE signal transmitted from the portable device is a threshold value or less and transmit to a pre-stored contract number a message which is generated on the basis of surroundings data acquired from at least one of a camera and a microphone provided in the electronic device, active an emergency rescue request mode when the operation mode activation signal is generated from an outside of the portable device. When it is determined from the operation mode activation signal that the strength of the BLE signal is the threshold value or less, the electronic device may transmit an alarm output message to the portable device so that the portable device outputs the alarm.

When the BLE communication with the electronic device is terminated, the portable device may output the alarm.

When an input is made to an input part formed in the first body, the portable device may transmit a search signal related to the input to the electronic device.

When the operation mode activation signal is the search signal received from the portable device to search for the electronic device, the electronic device may activate the loss prevention mode and output the alarm.

The electronic device may store the contact number as settings information when connected to the portable device.

The electronic device may check a location of the electronic device from a point in time at which the strength of the BLE signal is the threshold value or less to a point in time at which the BLE signal is finally received, check a location of the electronic device at the point in time at which the BLE signal is finally received when a final location check signal is received, add the checked location on map data, and display the checked location.

The electronic device may check a location of the electronic device from a point in time at which the emergency rescue request mode is activated, and transmit the message included the checked location to the pre-stored contact number.

When the first body is separated from the second body, the portable device may transmit an emergency rescue signal to the electronic device so that the electronic device activates the emergency rescue request mode.

Advantageous Effects

As described above, according to the inventive method and system for an emergency rescue request and loss prevention, a portable device interoperating with an electronic device is used to perform an emergency rescue request function and a function of preventing loss of belongings according to operation modes. Accordingly, it is possible to perform different functions with the single portable device according to a situation.

MODES OF THE INVENTION

Hereinafter, embodiments of the present invention will be described in detail with reference to the accompanying drawings. Throughout the drawings, it is to be understood that like elements are noted by like reference numerals if possible. The detailed description of well-known functions and constructions will be omitted so as not to obscure the gist of the present invention.

Figure 1:
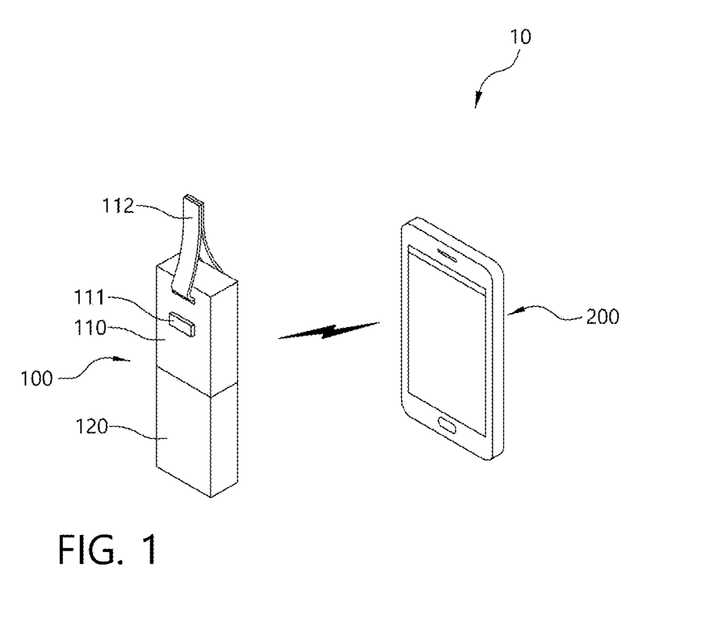
FIG. 1 is a view illustrating a system for an emergency rescue request and loss prevention according to an embodiment of the present invention.

FIG. 1 is a view illustrating a system for an emergency rescue request and loss prevention according to an embodiment of the present invention.

Referring to FIG. 1, a system 10 according to an embodiment of the present invention includes a portable device 100 and an electronic device 200.

The portable device 100 includes a processor (not shown), and the processor of the portable device 100 controls a Bluetooth low energy (BLE) communication module (not shown) to perform BLE communication with the electronic device 200. The processor of the portable device 100 constantly transmits a BLE signal by controlling the BLE communication module when connected to the electronic device 200 through pairing with the electronic device 200.

The processor of the portable device 100 may control a speaker (not shown) to output an alarm so as to prevent loss of the portable device 100. In other words, the processor may output an alarm on the basis of a message received from the electronic device 200 or output an alarm even without receiving a message from the electronic device 200 when it is checked that the BLE communication with the electronic device 200 is terminated due to surroundings such as a communication environment. Also, the processor may output an alarm when a search signal for the portable device 100 is received from the electronic device 200.

Also, the processor may transmit an input signal generated due to an external input to the electronic device 200. In this case, the input signal may be a search signal for searching for the electronic device 200 connected to the portable device 100 through BLE communication or an emergency rescue signal for sending an external notification that a user of the portable device 100 is in an emergency situation. The input signal may be generated when an input is made to an input part 111 formed in a first body 110 of the portable device 100 or the first body 110 is separated from a second body 120. When it is checked that the first body 110 of the portable device 100 is separated from the second body 120, the processor of the portable device 100 may output an alarm of a threshold value (e.g., 90 dB) or more by activating the speaker. The user may hang the portable device 100 on his or her belonging (not shown) using a strap 112 connected to the first body 110 of the portable device 100 or may let a child or an elderly person wear the portable device 100 as a necklace using a long strap. Also, a protruding part (not shown) is formed on the first body 110. When the protruding part is inserted into an insertion part (not shown) formed in the second body 120, the first body 110 and the second body 120 may be connected. When the protruding part is detached from the insertion part, the first body 110 may be separated from the second body 120. In addition, the first body 110 and the second body 120 may be connected or separated by magnetism.

The electronic device 200 includes a processor (not shown), and the processor of the electronic device 200 performs BLE communication with the portable device 100. More specifically, the processor of the electronic device 200 searches for a BLE signal transmitted from the portable device 100 and pairs with the electronic device 200. The electronic device 200 connected to the portable device 100 through pairing receives settings information from the user through an input part (not shown) such as a keypad or a touchpad. In this case, the settings information may be a telephone number of another portable terminal, telephone numbers such as 119 and 112, etc., which may be receivers of a report message when the electronic device 200 operates in an emergency rescue request mode. Also, the settings information may include text to be added to a report message and whether to output an alarm from the portable device 100 when the first body 110 of the portable device 100 is separated from the second body 120.

The processor of the electronic device 200 checks an operation mode activation signal. In this case, the operation mode activation signal may be a signal for operating the electronic device 200 in a loss prevention mode or the emergency rescue request mode. More specifically, the processor of the electronic device 200 may constantly check the strength of a BLE signal received from the portable device 100 and determine the BLE signal as an operation mode activation signal when the strength of the BLE signal is determined to be a threshold value or less. When a search signal is received from the portable device 100, the processor of the electronic device 200 may determine the search signal as an operation mode activation signal. When an emergency rescue signal is received from the portable device 100, the processor of the electronic device 200 may determine the emergency rescue signal as an operation mode activation signal.

The processor of the electronic device 200 activates the loss prevention mode when the operation mode activation signal is a signal for activating the loss prevention mode, that is, one of a signal implying that the strength of a BLE signal is the threshold value or less and the search signal. When the operation mode activation signal is a signal implying that the strength of a BLE signal is the threshold value or less, the processor of the electronic device 200 controls a speaker (not shown) provided in the electronic device 200 to output an alarm. Also, the processor of the electronic device 200 transmits a message to the portable device 100 so that the portable device 100 may output an alarm. In this case, when a BLE signal is not received from the portable device 100, the processor may not transmit the message to the portable device 100 and may only control the speaker to output an alarm. In addition, when a signal for searching for the portable device 100 is input from the input part (not shown) provided in the electronic device 200, the electronic device 200 transmits the search signal to the portable device 100 so that the portable device 100 may output an alarm. As such, the user can prevent loss of a belonging to which the portable device 100 is attached and the electronic device 200 through an alarm output from the portable device 100 and the electronic device 200.

Also, the processor of the electronic device 200 activates the loss prevention mode and activates a global positioning system (GPS) module (not shown) provided in the electronic device 200 to check the location of the electronic device 200 in real time or periodically from a point in time at which the loss prevention mode is activated, that is, a point in time at which the strength of a BLE signal is the threshold value or less, to a point in time at which a BLE signal is finally received. When a signal for checking a final location of the portable device 100 is received from the user, the processor checks the point in time at which a BLE signal is finally received from the portable device 100. The processor of the electronic device 200 checks the location of the electronic device 200 corresponding to the checked point in time, adds the checked location on map data, and displays the checked location. In this way, the user can check a location at which the portable device 100 is lost, and thus it is possible to increase the probability of finding the belonging to which the portable device 100 is attached.

Also, when the operation mode activation signal is a search signal, the processor of the electronic device 200 controls the speaker to output an alarm according to the search signal. As such, the electronic device 200 outputs an alarm on the basis of the search signal received from the portable device 100 so that the user can easily find the electronic device 200.

When the operation mode activation signal is an emergency rescue signal for activating the emergency rescue request mode, the processor of the electronic device 200 activates the emergency rescue request mode. The processor of the electronic device 200 activates the GPS module and activates at least one of a camera (not shown) and a microphone (not shown) included in the electronic device 200. The processor of the electronic device 200 generates a report message including data of surroundings acquired from at least one of the camera and the microphone. More specifically, the processor of the electronic device 200 may generate a report message including location information and data of surroundings acquired periodically or in real time from the GPS module and transmit the report message to a telephone number of another portable terminal, telephone numbers such as 119 and 112, a server address, and the like. In this way, when it is difficult to operate the electronic device 200, the user can request a transmission of a report message to a pre-stored contact number through simple manipulation of the portable device 100. Also, the processor of the electronic device 200 may acquire data of surroundings for a threshold time (e.g., three minutes) at threshold time intervals (e.g., five minutes). The electronic device 200 transmits a report message, which includes the data of surroundings acquired at the threshold time intervals, at threshold time intervals (e.g., five minutes) so that a receiver who receives the report message may check a path of the user. Also, the electronic device 200 may sequentially store the acquired data of surroundings in a memory (not shown). In addition, when the emergency rescue request mode is activated, the processor of the electronic device 200 may automatically make a phone call with a telephone number of another portable terminal, telephone numbers such as 119 and 112, a server address, or the like instead of transmitting a report message.

Figure 2:
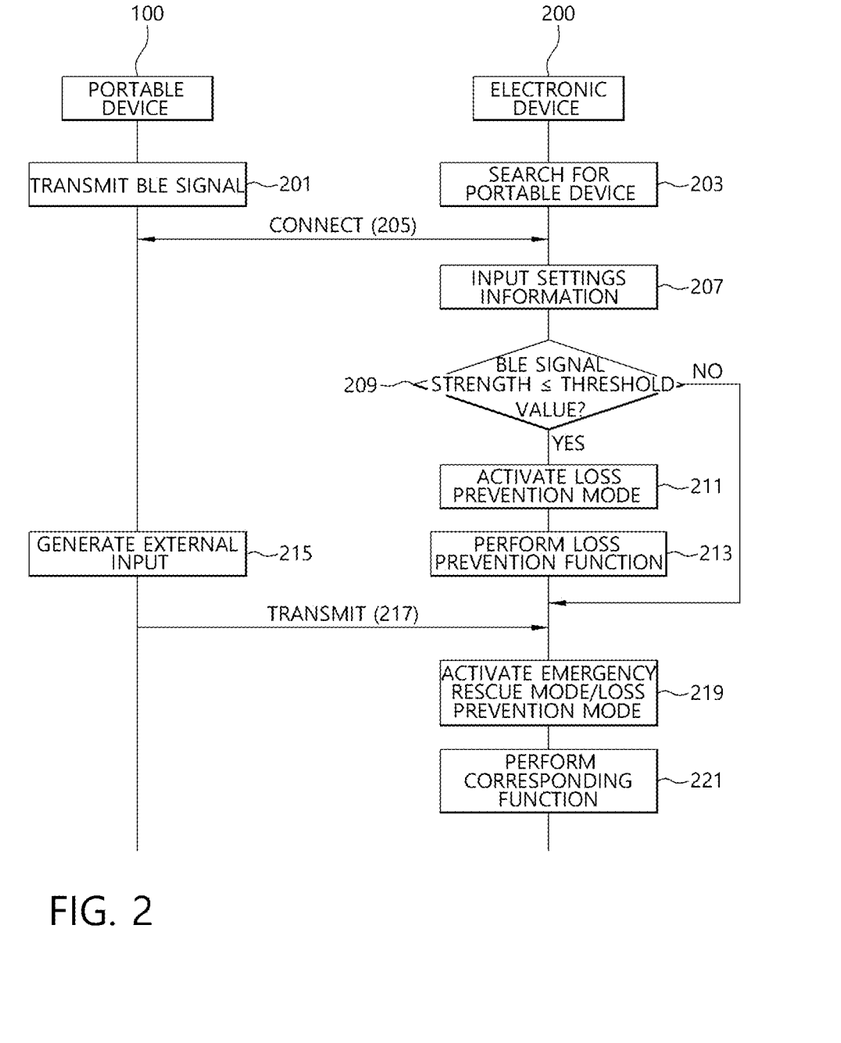
FIG. 2 is a flowchart illustrating a method of an emergency rescue request and loss prevention according to an embodiment of the present invention.

FIG. 2 is a flowchart illustrating a method of an emergency rescue request and loss prevention according to an embodiment of the present invention.

Referring to FIG. 2, in operation 201, the portable device 100 constantly transmits a BLE signal. In operation 203, the electronic device 200 detects the BLE signal and searches for the portable device 100 which transmits the BLE signal. In operation 205, the electronic device 200 is connected to the portable device 100 for BLE communication through pairing with the portable device 100.

In operation 207, settings information may be input from a user to the electronic device 200 through the input part (not shown), and the electronic device 200 may store the input settings information in the memory (not shown). In this case, the settings information may be a telephone number of another portable terminal, telephone numbers such as 119 and 112, etc., which may be receivers of a report message when the electronic device 200 operates in the emergency rescue request mode. The settings information may include text to be added to the report message and whether to output an alarm from the portable device 100 when the first body 110 is separated from the second body 120.

In operation 209, the electronic device 200 determines whether the strength of a BLE signal received from the connected portable device 100 is a threshold value or less. The electronic device 200 may perform operation 211 when it is determined in operation 209 that the strength of a BLE signal is the threshold value or less and may wait to receive a signal generated for an external input by the portable device 100 in operation 217 when it is determined in operation 209 that the strength of a BLE signal is not the threshold value or less. In operation 211, the electronic device 200 activates the loss prevention mode and performs operation 213. In operation 213, the electronic device 200 may perform a loss prevention function. More specifically, when the strength of a BLE signal is the threshold value or less, the electronic device 200 outputs an alarm which implies that the distance between the portable device 100 and the electronic device 200 is a threshold distance (30 m) or more. Also, the electronic device 200 transmits a message to the portable device 100 so that the portable device 100 may output an alarm. Since the user can see that the portable device 100 is spaced the threshold distance or more away from the electronic device 200 through alarms output from the portable device 100 and the electronic device 200, it is possible to prevent loss of a belonging to which the portable device 100 is attached.

In addition, when the strength of a BLE signal is the threshold value or less, the electronic device 200 may activate the GPS module (not shown) and check the location of the electronic device 200 in real time or periodically. The electronic device 200 may check the location of the electronic device 200 from a point in time at which the strength of a BLE signal is determined to be the threshold value or less to a point in time at which a BLE signal is not received from the portable device 100, that is, a point in time at which a BLE signal is finally received. When a signal for checking a final location of the portable device 100 is received from the user, the electronic device 200 checks the point in time at which a BLE signal is finally received from the portable device 100. The electronic device 200 may check the location of the electronic device 200 corresponding to the checked point in time, add the checked location on map data, and display the checked location. In this way, the user can check a location at which the portable device 100 is lost, and thus it is possible to increase the probability of finding the belonging to which the portable device 100 is attached.

When an external input is generated in operation 215, the portable device 100 performs operation 217. In operation 217, the portable device 100 transmits an input signal corresponding to the generated external input to the electronic device 200. In this case, the input signal may be a search signal for causing the electronic device 200 to activate the loss prevention mode and output an alarm according to a signal generated by the portable device 100 or an emergency rescue signal for causing the electronic device 200 to activate the emergency rescue request mode and transmit a report message related to emergency rescue to a contact number pre-stored in the electronic device 200. In other words, when an input signal is generated from the input part 111 formed in the portable device 100, the portable device 100 transmits a search signal to the electronic device 200, and when an input signal is generated due to the first body 110 being separated from the second body 120, the portable device 100 may transmit an emergency rescue signal to the electronic device 200.

In operation 219, the electronic device 200 activates any one of the emergency rescue mode and the loss prevention mode on the basis of the received input signal. More specifically, when the input signal is a search signal, the electronic device 200 outputs an alarm. In this way, the user may check the location of the electronic device 200.

More specifically, when the input signal is an emergency rescue signal, the electronic device 200 activates at least one of the camera (not shown) and the microphone (not shown) included in the electronic device 200 to acquire data of surroundings and activates the GPS module to acquire location information of the electronic device 200 periodically or in real time. The electronic device 200 may generate a report message including text modified in operation 207 or text which is set by default and the location information acquired from the GPS module. The electronic device 200 may include the data of surroundings acquired from at least one of the camera and the microphone in the report message. The electronic device 200 may transmit the generated report message to the telephone number of another portable terminal, the telephone numbers such as 119 and 112, the server address, and the like input in operation 207. Also, the processor of the electronic device 200 may acquire data of surroundings for a threshold time (e.g., three minutes) at threshold time intervals (e.g., five minutes). The electronic device 200 transmits a report message, which includes the data of surroundings acquired at the threshold time intervals, at threshold time intervals (e.g., five minutes) so that a receiver who receives the report message may check a path of the user. In addition, the processor of the electronic device 200 may automatically make a phone call with the telephone number of another portable terminal, the telephone numbers such as 119 and 112, or the like instead of transmitting a report message or may simultaneously transmit the report message and make a phone call. In this way, when it is difficult to use the electronic device 200, the user can request a transmission of a report message to a pre-stored contact number through simple manipulation of the portable device 100.

Moreover, it has been described above as an example that operations 209 to operation 213 are performed and then operations 215 to operation 221 are performed, but operations 209 to operation 213 and operations 215 to operation 221 may be performed in parallel regardless of sequence.

Figure 3:
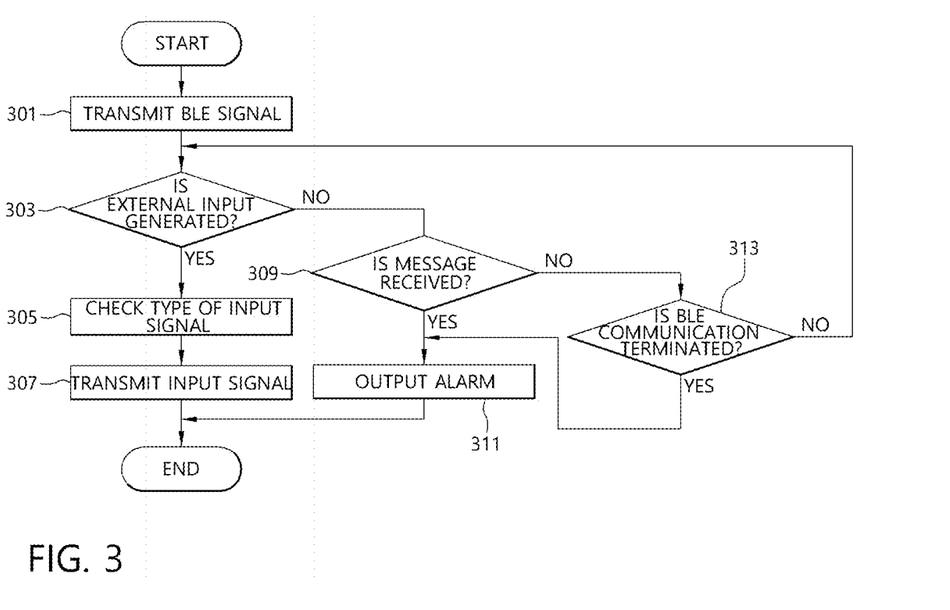
FIG. 3 is a flowchart illustrating a method of an emergency rescue request and loss prevention using a portable device according to an embodiment of the present invention.

FIG. 3 is a flowchart illustrating a method of an emergency rescue request and loss prevention by a portable device according to an embodiment of the present invention.

Referring to FIG. 3, in operation 301, the processor (not shown) of the portable device 100, which is connected to the electronic device 200 through pairing, constantly transmits a BLE signal. In operation 303, the processor checks whether an external input is generated. In this case, an external input may be generated from the input part 111 formed in the first body 110 of the portable device 100 or generated due to the first body 110 being separated from the second body 120. When generation of an external input is checked in operation 303, the processor performs operation 305, and when generation of an external input is not checked, the processor performs operation 309.

In operation 305, the processor checks the type of an input signal resulting from the generation of an external input. In operation 307, the processor transmits the checked input signal to the electronic device 200. In this case, the input signal may be a search signal for causing the electronic device 200 to activate the loss prevention mode and output an alarm or an emergency rescue signal for causing the electronic device 200 to activate the emergency rescue request mode and transmit a report message related to emergency rescue to a contact number pre-stored in the electronic device 200. In other words, when the input signal is generated from the input part 111, the portable device 100 may determine that the input signal is a search signal and transmit the search signal. Also, when the input signal is generated due to the first body 110 being separated from the second body 120, the portable device 100 may determine that the input signal is an emergency rescue signal and transmit an emergency rescue signal. In addition, although not shown in the drawing, when the input signal is generated due to the first body 110 being separated from the second body 120, the portable device 100 may output an alarm of a threshold value (e.g., 90 dB) or more by controlling the speaker included in the portable device 100.

In operation 309, the processor determines whether a message for outputting an alarm from the electronic device 200 is received. When it is determined in operation 309 that the message is not received from the electronic device 200, the processor performs operation 313. When it is determined in operation 313 that BLE communication with the electronic device 200 is terminated due to surroundings such as a communication environment, the processor performs operation 311 to output an alarm. To the contrary, when it is not determined that BLE communication with the electronic device 200 is terminated, the processor may return to operation 303 to perform the above operations again.

When it is determined in operation 309 that the message is received from the electronic device 200, the processor performs operation 311. In operation 311, the processor may output an alarm according to the message. The message may be intended for the electronic device 200 receiving a BLE signal transmitted from the portable device 100 to output an alarm implying that the electronic device 200 and the portable device 100 are spaced a threshold distance or more apart on the basis of the strength of the BLE signal. Also, the message may be a search signal for the electronic device 200 to search for the portable device 100. In this way, a user can recognize an alarm output from the portable device 100 and prevent loss of a belonging to which the portable device 100 is attached or the electronic device 200 communicating with the portable device 100.

Figure 4:
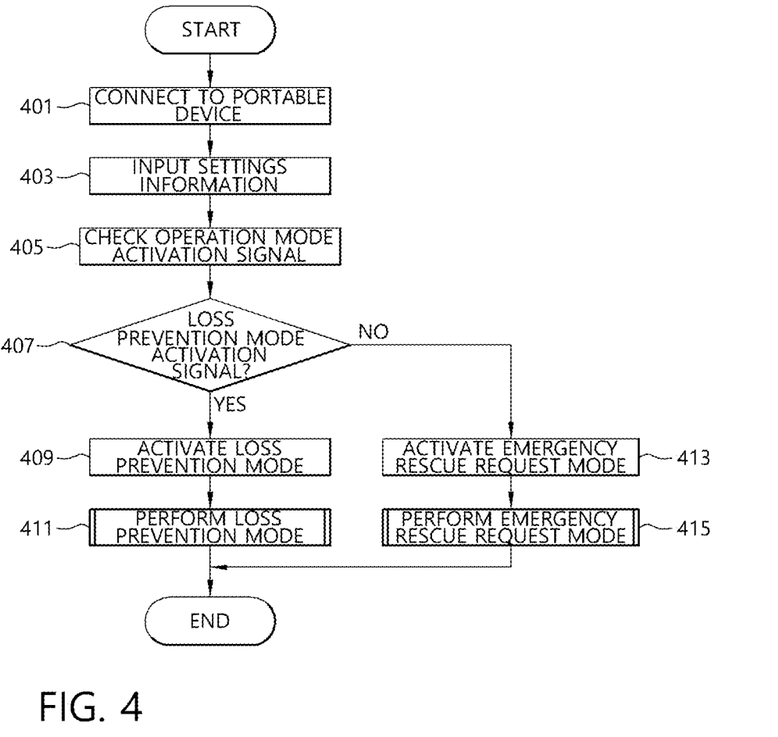
FIG. 4 is a flowchart illustrating a method of an emergency rescue request and loss prevention using an electronic device according to an embodiment of the present invention.

FIG. 4 is a flowchart illustrating a method of an emergency rescue request and loss prevention using an electronic device according to an embodiment of the present invention.

Referring to FIG. 4, the electronic device 200 is connected to the portable device 100 through BLE communication in operation 401 and inputs settings information in operation 403. In this case, the settings information may be a telephone number of another portable terminal, telephone numbers such as 119 and 112, a server address, etc., which may be receivers of a report message when the electronic device 200 operates in the emergency rescue request mode. The settings information may include text to be added to the report message and whether to output an alarm from the portable device 100 when the first body 110 is separated from the second body 120.

In operation 405, the electronic device 200 checks an operation mode activation signal. In this case, the operation mode activation signal may be a signal for operating the electronic device 200 in the loss prevention mode or the emergency rescue request mode. More specifically, the electronic device 200 may constantly check the strength of a BLE signal received from the portable device 100 and determine the BLE signal as an operation mode activation signal when the strength of the BLE signal is determined to be a threshold value or less. When a search signal is received from the portable device 100, the electronic device 200 may determine the search signal as an operation mode activation signal. When an emergency rescue signal is received from the portable device 100, the electronic device 200 may determine the emergency rescue signal as an operation mode activation signal.

When the operation mode activation signal is a signal for activating the loss prevention mode in operation 407, the electronic device 200 performs operation 409. When the operation mode activation signal is a signal for activating the emergency rescue request mode, the electronic device 200 performs operation 413. In this case, the electronic device 200 may determine a signal implying that the strength of a BLE signal is the threshold value or less and a search signal as a signal for activating the loss prevention mode.

Figure 5:
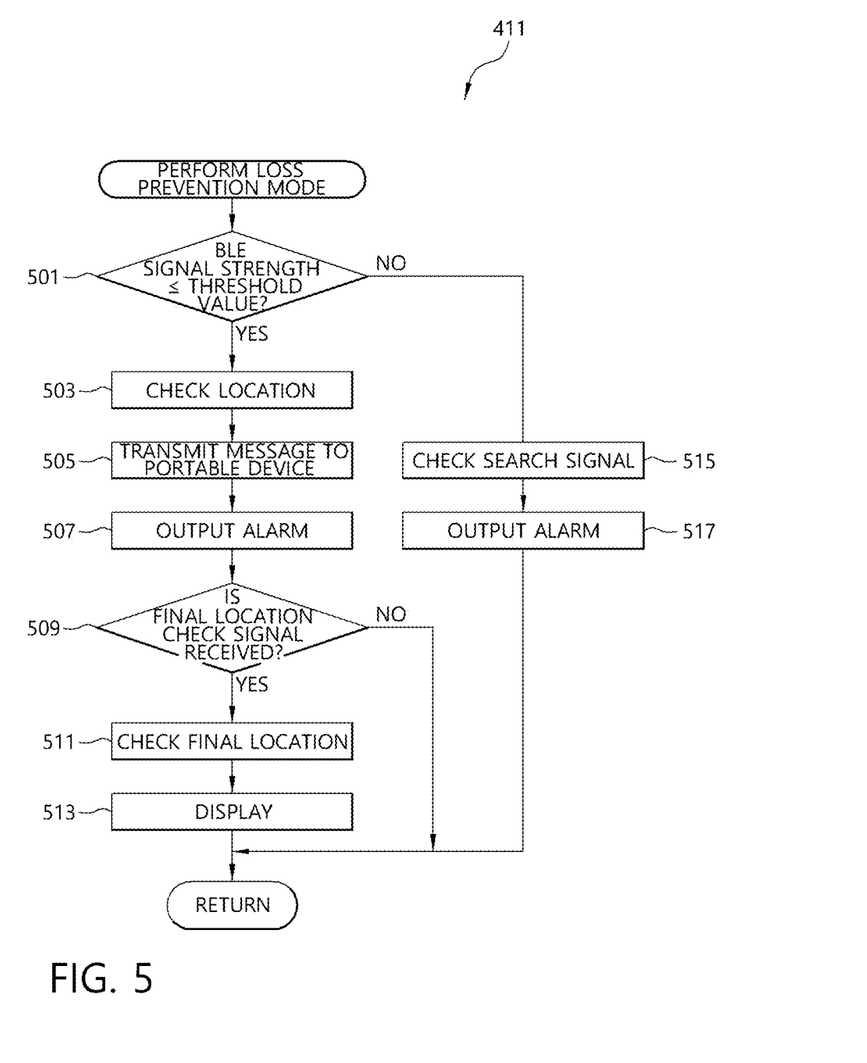
FIG. 5 is a detailed flowchart illustrating a method of performing a loss prevention mode using an electronic device according to an embodiment of the present invention.

The electronic device 200 may activate the loss prevention mode in operation 409 and perform the loss prevention mode in operation 411. In this case, a method of performing the loss prevention mode will be described below with reference to FIG. 5. FIG. 5 is a detailed flowchart illustrating a method of performing the loss prevention mode using an electronic device according to an embodiment of the present invention.

Referring to FIG. 5, when the signal for activating the loss prevention mode is a signal implying that the strength of a BLE signal is the threshold value or less in operation 501, the processor (not shown) of the electronic device 200 performs operation 503.

To the contrary, when the signal for activating the loss prevention mode is not a signal implying that the strength of a BLE signal is the threshold value or less, the processor performs operation 515. The processor determines that the signal for activating the loss prevention mode is a search signal received from the portable signal in operation 515 and performs operation 517. In operation 517, the electronic device 200 may output an alarm according to the search signal and end the process. As such, the electronic device 200 outputs an alarm on the basis of a search signal received from the portable device 100 so that the user can easily find the electronic device 200.

In operation 503, the processor activates the GPS module (not shown) included in the electronic device 200 to check the location information of the electronic device 200 in real time or periodically. The processor transmits a message to the portable device 100 in operation 505 and controls the electronic device 200 to output an alarm in operation 507. As the processor transmits the message to the portable device 100, the portable device 100 may output an alarm. As such, since the strength of the BLE signal is the threshold value or less, the processor may determine that the distance between the electronic device 200 and the portable device 100 is approximate to a threshold distance (e.g., 30 m). Therefore, the processor transmits a message to the portable device 100 so that the portable device 100 may output an alarm, and the electronic device 200 outputs an alarm so that the user can prevent loss of the portable device 100 or a belonging to which the portable device 100 is attached.

When a signal for checking a final location of the portable device 100 is received from the user in operation 509, the processor performs operation 511. In operation 511, the processor may check a point in time at which a BLE signal is finally received from the portable device 100 and check the location of the electronic device 200 at the checked point in time. In other words, the processor may check location information acquired at a point in time at which a BLE signal is finally received among pieces of location information received from the GPS module activated in operation 503. In operation 513, the processor adds the checked location on map data, displays the checked location, and ends the process. Accordingly, the user can check a location at which the portable device 100 is lost, and thus it is possible to increase the probability of finding the belonging to which the portable device 100 is attached or a child or an elder wearing the portable device 100 as a necklace.

Figure 6:
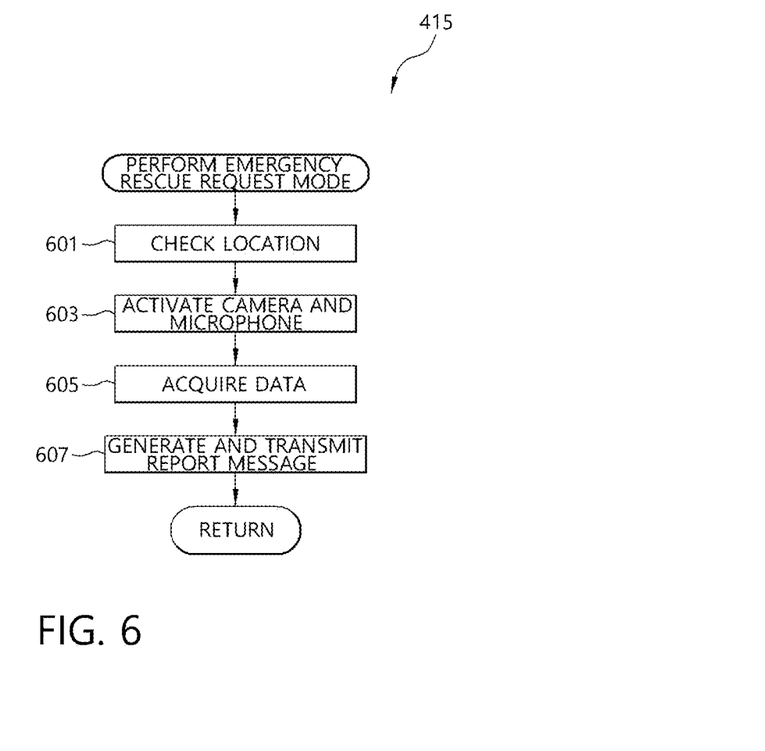
FIG. 6 is a detailed flowchart illustrating a method of performing an emergency rescue request mode using an electronic device according to an embodiment of the present invention.

The electronic device 200 may activate the emergency rescue request mode in operation 413 and perform the emergency rescue request mode in operation 415. In this case, a method of performing the emergency rescue request mode will be described below with reference to FIG. 6. FIG. 6 is a detailed flowchart illustrating a method of performing the emergency rescue request mode using an electronic device according to an embodiment of the present invention.

Referring to FIG. 6, the electronic device 200 activates the GPS module included in the electronic device 200 to check the location information of the electronic device 200 in real time or periodically in operation 601 and performs operation 603. The processor activates at least one of the camera (not shown) and the microphone (not shown) included in the electronic device 200 in operation 603 and performs operation 605. In operation 605, the electronic device 200 acquires data of surroundings by controlling at least one of the camera and the microphone. In operation 607, the electronic device 200 generates and transmits a report message and then ends the process. More specifically, in the report message, the electronic device 200 may include the location information acquired in operation 601 and the text input by the user when the settings information is input in operation 403 of FIG. 4. Also, the report message may include the data of surroundings acquired from at least one of the camera and the microphone. The electronic device 200 may transmit the generated report message to the telephone number of another portable terminal, the telephone numbers such as 119 and 112, the server address, etc. which correspond to the settings information input in operation 403 of FIG. 4. Also, the processor of the electronic device 200 may acquire data of surroundings for a threshold time (e.g., three minutes) at threshold time intervals (e.g., five minutes). The electronic device 200 transmits a report message, which includes the data of surroundings acquired at the threshold time intervals, at threshold time intervals (e.g., five minutes) so that a receiver who receives the report message may check a path of the user. In this way, when it is difficult to use the electronic device 200, the user can request a transmission of a report message to a pre-stored contact number through simple manipulation of the portable device 100. In addition, although it has been described in operation 607 that the report message is transmitted, the present invention is not necessarily limited thereto. The processor of the electronic device 200 may automatically make a phone call with the telephone number of another portable terminal, the telephone numbers such as 119 and 112, or the like or may simultaneously transmit the report message and make a phone call.

Meanwhile, the embodiments of the present invention disclosed in the specification and drawings are presented as specific examples only not to restrict the scope of the present invention but to describe technical details of the present invention with ease and to aid in understanding of the present invention. In other words, it is obvious to those of ordinary skill in the art that other modifications based on technical spirit of the present invention can be made.

The invention claimed is:

1. A method of an emergency rescue request and loss prevention of an electronic device, the method comprising:
storing a contact number as setting information when the electronic device is connected to a portable device,
checking a first operation mode activation signal by the electronic device connected to the portable device through Bluetooth low energy (BLE) communication;
activating a loss prevention mode when the first operation mode activation signal indicates that a strength of a BLE signal transmitted from the portable device is a threshold value or less and transmitting an alarm output message to the portable device so that the portable device outputs an alarm;
checking a second operation mode activation signal by the electronic device connected to the portable device through the BLE communication;
activating an emergency rescue request mode and outputting the alarm when the second operation mode activation signal is generated according to a user's input of the portable device, wherein a first body and a second body of the portable device are connected or separated by magnetism and the user's input comprises the first body of the portable device being separated from the second body of the portable device;
checking, by the electronic device, a first location of the electronic device from a point in time at which the strength of the BLE signal is the threshold value or less to a point in time at which the BLE signal is most recently received from the portable device;
checking, by the electronic device, a second location of the electronic device from a point in time at which the emergency rescue request mode is activated;
displaying, by the electronic device, map data which include the checked first location and the second location of the electronic device; and
transmitting to a pre-stored contact number a message which is generated on the basis of surroundings data acquired from at least one of a camera and a microphone provided in the electronic device.

2. The method of claim 1, further comprising:
activating the loss prevention mode and outputting the alarm when the first operation mode activation signal is a signal generated from the outside of the portable device to search for the electronic device.

3. A system for an emergency rescue request and loss prevention, the system comprising:
a portable device configured to perform Bluetooth low energy (BLE) communication and including a first body and a second body, wherein the first body and the second body are connectable or separable by magnetism; and
an electronic device configured to:
store a contact number as setting information when connected to the portable device;
activate a loss prevention mode and when a first operation mode activation signal checked through communication with the portable device implies that a strength of a BLE signal transmitted from the portable device is a threshold value or less, and transmit an alarm output message to the portable device to cause the portable device to output an alarm;
activate an emergency rescue request mode and output the alarm when a second operation mode activation signal checked through communication with the portable device is generated according to a user's input of the portable device, wherein the user's input comprises the first body of the portable device being separated from the second body of the portable device;
check a first location of the electronic device from a point in time at which the strength of the BLE signal is the threshold value or less to a point in time at which the BLE signal is most recently received from the portable device;
check a second location of the electronic device from a point in time at which the emergency rescue request mode is activated;
display map data that include the checked first location and the second location of the electronic device; and transmit to a pre-stored contact number a message which is generated on the basis of surroundings data acquired from at least one of a camera and a microphone provided in the electronic device.

4. The system of claim 3, wherein the portable device configured to, when the BLE communication with the electronic device is terminated, output the alarm.

5. The system of claim 3, wherein the portable device configured to, when a search request input is made to an input part formed in the first body, transmit a search signal related to the search request input to the electronic device.

6. The system of claim 5, wherein the electronic device configured to, when the first operation mode activation signal is the search signal received from the portable device to search for the electronic device, activate the loss prevention mode and output the alarm.

7. The system of claim 3, wherein the portable device configured to, when the first body is separated from the second body, transmit an emergency rescue signal to the electronic device so that the electronic device activates the emergency rescue request mode.

\* \* \* \* \*